United States Patent [19]

Kusunose

[11] Patent Number: 4,597,022
[45] Date of Patent: Jun. 24, 1986

[54] MODE SWITCHING CIRCUIT FOR USE IN A REPRODUCING APPARATUS

[75] Inventor: Kenji Kusunose, Maebashi, Japan

[73] Assignee: Victor Company of Japan, Ltd., Yokohama, Japan

[21] Appl. No.: 564,425

[22] Filed: Dec. 22, 1983

[30] Foreign Application Priority Data

Dec. 28, 1982 [JP] Japan .............................. 57-200358[U]

[51] Int. Cl.$^4$ ...................... G11B 15/12; G11B 15/46
[52] U.S. Cl. ..................................... 360/62; 360/74.4
[58] Field of Search ................. 360/61, 62, 74.2, 74.4, 360/73

[56] References Cited

U.S. PATENT DOCUMENTS

| | | | |
|---|---|---|---|
| 4,288,823 | 9/1981 | Yamamuro et al. | 360/72.2 |
| 4,301,481 | 11/1981 | Suzuki | 360/62 |
| 4,367,500 | 1/1983 | Furuta et al. | 360/74.2 |

*Primary Examiner*—Vincent P. Canney
*Attorney, Agent, or Firm*—Ladas & Parry

[57] ABSTRACT

A mode switching circuit is for use in a reproducing apparatus, and comprises a rotation detecting circuit for detecting the rotation of a rotary body which rotates according to a moving tape, a plunger solenoid for driving a plunger which switches the operating state of the reproducing apparatus to a state which is in accordance with the moving mode of the tape, an unrecorded band detecting circuit for detecting an unrecorded band from the tape which moves in a fast-forward mode during a program selecting mode of the reproducing apparatus, a control circuit coupled to the rotation detecting circuit and to the unrecorded band detecting circuit, and a feedback path coupled from a connection point between the control circuit and the plunger solenoid to the rotation detecting circuit through a resistor. The control circuit cuts off a supply of a current to the plunger solenoid while the rotation detecting circuit is detecting the rotation of the rotary body, supplies a current to the plunger solenoid when the rotation detecting circuit detects a stoppage of the rotation of the rotary body, and supplies a current to the plunger solenoid when the unrecorded band detecting circuit detects an unrecorded band during the program selecting mode of the reproducing apparatus.

6 Claims, 6 Drawing Figures

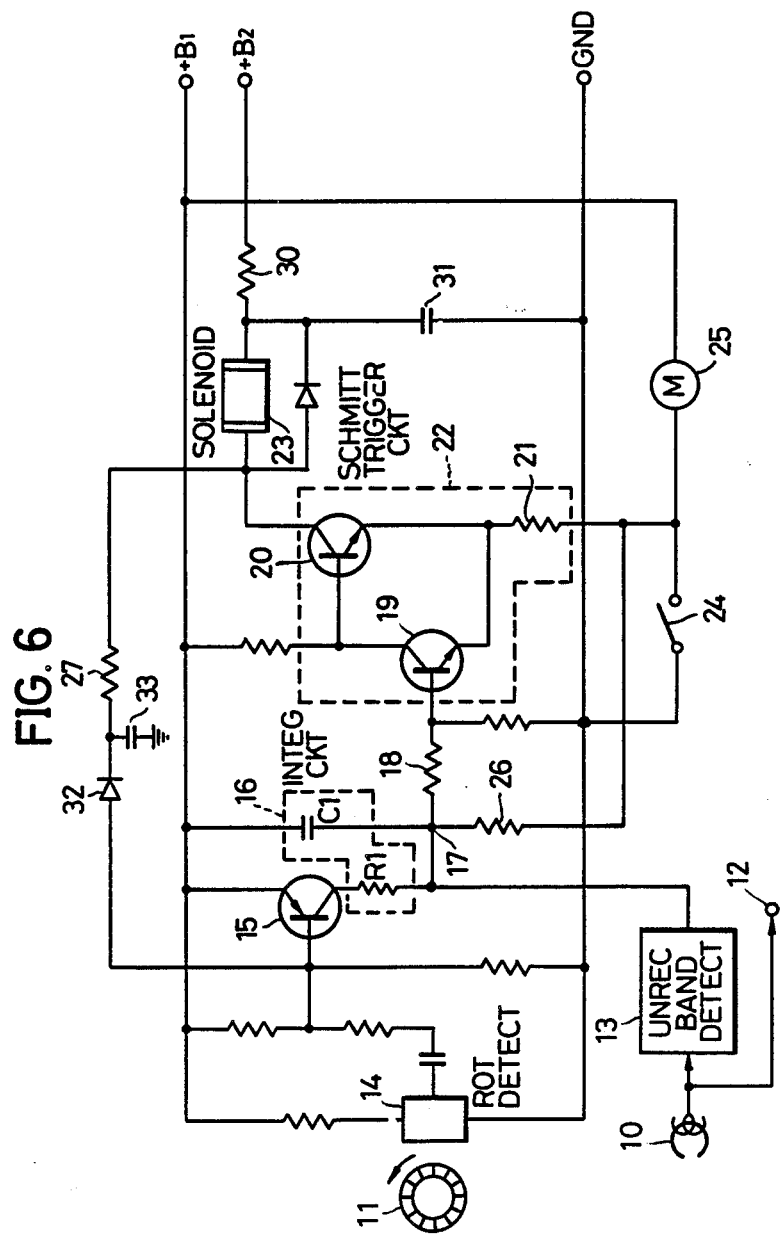

MODE SWITCHING CIRCUIT FOR USE IN A REPRODUCING APPARATUS

BACKGROUND OF THE INVENTION

The present invention generally relates to mode switching circuits for use in reproducing apparatuses, and more particularly to a mode switching circuit which is designed to positively switch the mode of a reproducing apparatus to a stop mode when an end of tape is reached during an automatic program selecting mode of the reproducing apparatus.

Generally, a pre-recorded magnetic tape which is played in a reproducing apparatus which has a program selecting function, is recorded with a plurality of programs with an unrecorded part formed between two mutually adjacent programs. Hence, during a program selecting mode of a reproducing apparatus which has an automatic program selecting function, the magnetic tape is moved at a high speed in a state where a head is in contact with the moving magnetic tape, and the number of programs (program number) is usually counted by counting the number of unrecorded parts. For example, a number which corresponds to the program number of a desired program among the recorded programs on the magnetic tape, is first set. Then, the number of the unrecorded parts on the magnetic tape is counted while the magnetic tape is moved in a fast-forward program selecting mode, so as to compare the counted value with the value of the number which has been set. When the counted value and the value of the set number coincide, a plunger is operated to switch the moving mode of the magnetic tape to a normal-speed mode from the fast-forward program selecting mode, so as to normally start the reproduction from the desired program. A program selecting device disclosed in the U.S. Pat. No. 4,241,364, for example, may be employed to set the desired program.

The reproducing apparatus of the type described above, is designed to detect an end of the magnetic tape. When the end of the magnetic tape is detected, the plunger described above is operated to switch the mode of the reproducing apparatus to a stop mode. Accordingly, the plunger usually operates twice when the desired program is set and the reproduction is started from the desired program. That is, when the desired program is set and the mode of the reproducing apparatus is set to the program selecting mode, the magnetic tape moves in the fast-forward program selecting mode while the head is in contact with the moving magnetic tape to detect the number of unrecorded parts. When the counted value of the unrecorded parts coincides with the value of the set number, the plunger is operated for the first time to switch the mode of the reproducing apparatus to a reproducing mode. As the reproducing operation progresses and an end of the magnetic tape is reached, tape end detecting means detects the end of the magnetic tape and the plunger is operated for the second time so as to switch the mode of the reproducing apparatus to the stop mode.

In the conventional reproducing apparatus of the type described heretofore, if the mode of the reproducing apparatus is set to the program selecting mode in a state where the last program on the magnetic tape has been reached, the end of the magnetic tape will be reached before the unrecorded part is detected. In this case, the tape end detecting means will detect the end of the magnetic tape, and the plunger will be operated for the first time. Accordingly, the mode of the reproducing apparatus will be switched to the reproducing mode by this first operation of the plunger. However, although the end of the magnetic tape is reached and the magnetic tape cannot move any further, the mode of the reproducing apparatus will not change to the stop mode. Hence, even though the end of the magnetic tape has been reached, a current will continuously be applied to the plunger, and a capstan will continue to rotate. Thus, a pinch roller will remain in pressed contact with the capstan in a state where the magnetic tape is pinched between the pinch roller and the capstan. Further, a driving force for rotating a take-up reel in a direction so as to take up the magnetic tape, will continue to be transmitted to the take-up reel.

SUMMARY OF THE INVENTION

Accordingly, it is a general object of the present invention to provide a novel and useful mode switching circuit for use in a reproducing apparatus, in which the above described problems have been eliminated.

Another and more specific object of the present invention is to provide a mode switching circuit for use in a reproducing apparatus, which is designed so that a plunger for switching the mode of the reproducing apparatus is operated a plurality of times when an end of a magnetic tape is reached before an unrecorded part is detected during a program selecting mode of the reproducing apparatus. According to the circuit of the present invention, when the end of the magnetic tape is reached before an unrecorded part is detected during the program selecting mode of the reproducing apparatus, the mode of the reproducing apparatus will be switched to a reproducing mode by a first operation of the plunger, however, the mode of the reproducing apparatus will be switched, to a stop mode by a second operation of the plunger. Hence, although there is a problem in the conventional reproducing apparatus in that the conventional reproducing apparatus may remain in the reproducing mode when the end of the magnetic tape is reached depending on the condition in which the program selecting mode is started, such a problem is eliminated according to the present invention, and the mode of the reproducing apparatus can positively be switched to the stop mode when the end of the magnetic tape is reached regardless of the condition in which the program selecting mode is started.

Other objects and further features of the present invention will be apparent from the following detailed description when read in conjunction with the accompanying drawings.

BRIEF DESCRIPTION OF THE DRAWINGS

FIG. 6 is a systematic circuit diagram showing a fourth embodiment of a mode switching circuit according to the present invention.

DETAILED DESCRIPTION

Figure 1:
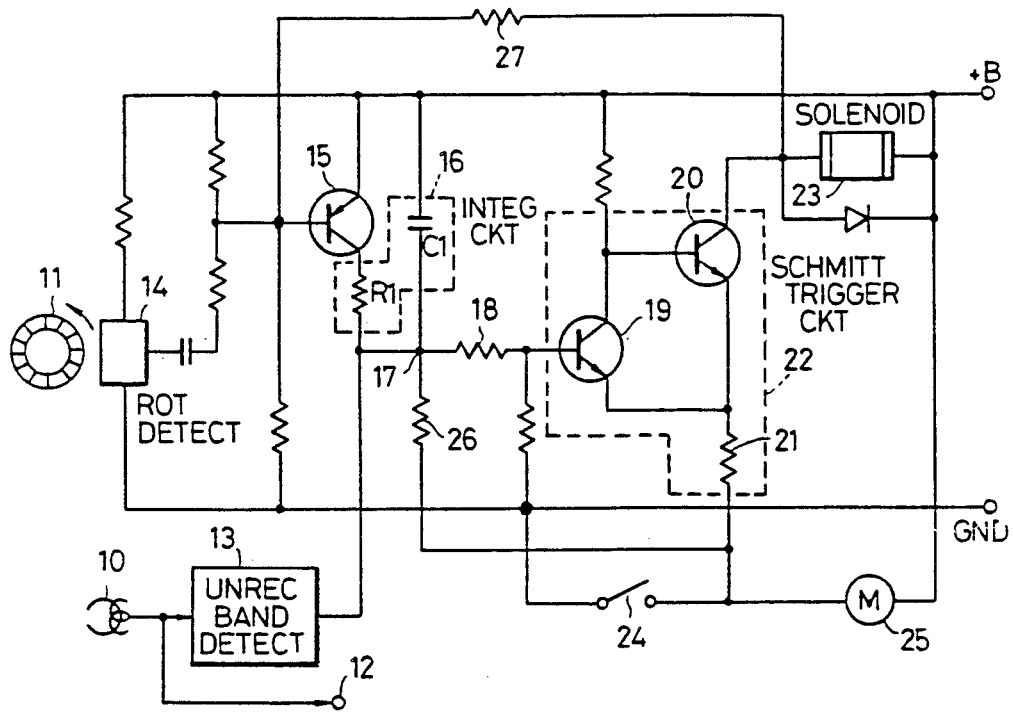
FIG. 1 is a systematic circuit diagram showing a first embodiment of a mode switching circuit according to the present invention.

First, description will be given with respect to a first embodiment of a mode switching circuit according to the present invention, by referring to FIG. 1. A reproducing apparatus which is applied with the present embodiment of the invention, operates with a tape cassette. The tape cassette accommodates a magnetic tape which has both ends thereof connected to leader tapes which are fixed to reel hubs. A magnetic head 10 is in contact with the magnetic tape during a normal reproducing mode and a program selecting mode, and reproduces a signal which is recorded on the magnetic tape. A multi-pole magnet 11 is provided on one reel base which rotates one reel hub, and this magnet 11 rotates unitarily with the reel base. During the normal reproducing mode, the signal which is reproduced by the head 10, is supplied to a reproducing circuit through a terminal 12.

During the program selecting mode, the signal which is reproduced by the head 10, is supplied to an unrecorded band detecting circuit 13. The detecting circuit 13 detects a discontinuity in the reproduced signal which exists over a predetermined time, and hence detects an unrecorded part between two mutually adjacent programs. This detecting circuit 13 is also used in the conventional reproducing apparatus, and a circuit having a known circuit construction may be employed for this detecting circuit 13. A rotation detecting circuit 14 detects whether the magnet 11, that is, the reel base, is rotating or stationary. The rotation detecting circuit 14 may have a known circuit construction including Hall elements which cooperate with the magnet 11 and an amplifier. When the end of the tape is reached, the reel base is prevented from undergoing further rotation because the end of the tape is fixed to the reel hub, and the rotation detecting circuit 14 detects that the reel base is stationary.

Figure 2:
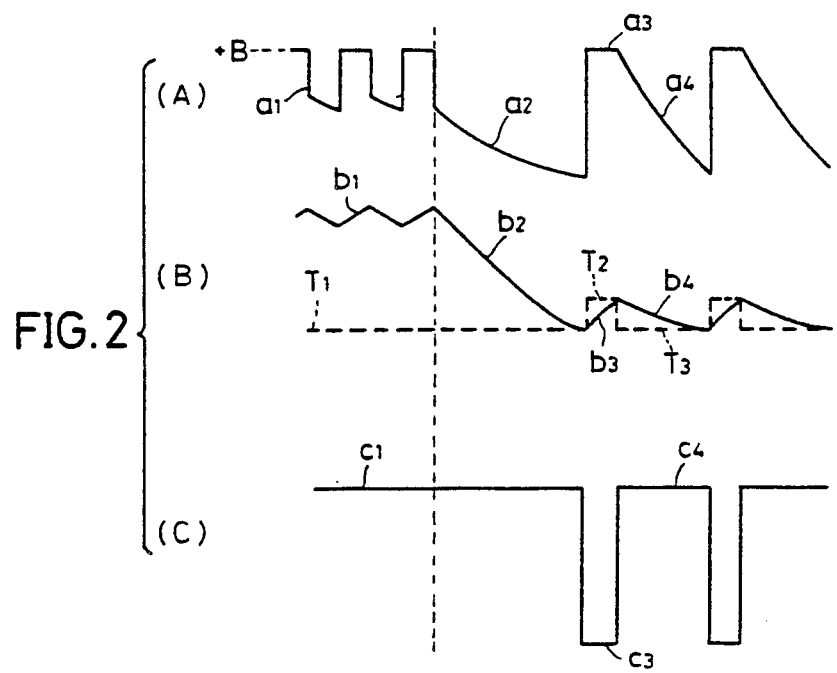
FIGS. 2(A) through 2(C) are graphs respectively showing signal waveforms at each part of the circuit system shown in FIG. 1.

Description will now be given with respect to the operation of the mode switching circuit during a program selecting mode in which the reproduction is automatically started from a desired program, by moving the tape in a fast-forward mode and detecting the unrecorded bands on the tape. As the tape is moved in the fast-forward mode, the magnet 11 rotates together with the reel base, and a pulse signal is obtained from the rotation detecting circuit 14. This pulse signal is applied to a base of a PNP type transistor 15. Thus, an amplified signal a1 having the signal waveform shown in FIG. 2(A), is obtained through a collector of the transistor 15. A signal b1 having the signal waveform shown in FIG. 2(B) is obtained at a connection point 17 between a resistor $R_1$ and a capacitor $C_1$ which constitute an integrating circuit 16. This signal b1 is passed through a resistor 18 and is applied to a base of an NPN type transistor 19 which constitutes a Schmitt trigger circuit 22 together with an NPN type transistor 20 and a feedback resistor 21. Because the level of the signal b1 is greater than a threshold level $T_1$ of the transistor 19 which is indicated by a broken line in FIG. 2(B), the transistor 19 is turned ON. Accordingly, the transistor 20 is turned OFF, and a high level signal c1 shown in FIG. 2(C) is obtained through a collector of the transistor 20. Hence, a current is not applied to a plunger solenoid 23, and the plunger is in a deactivated state. In this state, the program selecting mode will not be changed, and the tape will continue to be move in the fast-forward mode.

In the above state, when the unrecorded band on the tape is reached, the base voltage of the transistor 19 becomes less than the threshold level $T_1$, and the transistor 19 is turned OFF. Thus, the transistor 20 is turned ON, and a current is applied to the plunger solenoid 23. Accordingly, the plunger is activated, and the mode of the reproducing apparatus is switched to the normal reproducing mode from the program selecting mode. After the reproducing apparatus assumes the normal reproducing mode, the unrecorded band detecting circuit 13 assumes a non-operating state. On the other hand, because the rotation detecting circuit 14 produces the pulse signal, the transistor 19 is turned ON. As a result, the transistor 20 is turned OFF, and the current is not applied to the plunger solenoid 23 after the reproducing apparatus assumes the normal reproducting mode.

When the end of the tape is reached during the normal reproducing mode, the magnet 11 stops rotating, and for this reason, no pulse signal is produced from the rotation detecting circuit 14. Consequently, the transistor 15 is turned OFF, and a signal a2 having the signal waveform shown in FIG. 2(A) is obtained through the collector of the transistor 15. Moreover, the voltage at the connection point 17 decreases as indicated by b2 in FIG. 2(B). When the voltage b2 decreases to the threshold level $T_1$ of the transistor 19, the transistor 19 is turned OFF and the transistor 20 is turned ON. In this state, a collector voltage c3 of the transistor 20 assumes a low level as shown in FIG. 2(C), and a current is applied to the plunger solenoid 23. Therefore, the plunger is activated for the second time, and the mode of the reproducing apparatus is switched from the normal reproducing mode to a stop mode.

When the reproducing apparatus assumes the stop mode, a motor control switch 24 opens to cut off the current supply to a reel motor 25, and the motor 25 stops rotating. In addition, a small current from a power source +B is applied to the transistor 19, through the motor 25 and resistors 26 and 18. Thus, the transistor 19 is turned ON, and the transistor 20 is turned OFF. As a result, the mode switching circuit assumes its initial state, and becomes ready to carry out a subsequent operation.

Next, description will be given with respect to a case where the end of the tape is reached before the unrecorded band is detected during the program selecting mode. When the end of the tape is reached during the program selecting mode, the magnet 11 stops rotating, and the rotation detecting circuit 14 no longer produces the pulse signal. Hence, the transistor 15 is turned OFF, and the signal obtained through the collector of the transistor 15 becomes as shown by a2 in FIG. 2(A). Further, the voltage b2 at the connection point 17 decreases as shown in FIG. 2(B). When the voltage b2 decreases to the threshold level $T_1$ of the transistor 19, the transistor 19 is turned OFF and the transistor 20 is turned ON. The collector voltage c3 of the transistor 20 thus assumes a low level as shown in FIG. 2(C). Consequently, a current is applied to the plunger solenoid 23, and the plunger is activated for the first time, to switch the mode of the reproducing apparatus from the program selecting mode to the normal reproducing mode.

However, according to the conventional circuit, there was a problem in that the reproducing apparatus remained in the normal reproducing mode after the mode is switched from the program selecting mode, although the end of the tape has been reached. Hence, according to the conventional circuit, a current was continuously applied to the plunger solenoid 23, and a current was continuously applied to the motor 25.

On the other hand, according to the mode switching circuit of the present invention, the operation which will be described hereinafter is carried out after the mode of the reproducing apparatus is switched to the normal reproducing mode from the program selecting mode, in order to eliminate the above problem of the conventional circuit.

In other words, according to the mode switching circuit of the present invention, the current from the power source +B flows to ground through the plunger solenoid 23, the transistor 20, the resistor 21, and the switch 24. A resistor 27 which constitutes an essential part of mode switching circuit according to the present invention, is coupled between the collector of the transistor 20 and the base of the transistor 15. For this reason, the voltage at the base of the transistor 15 is made small by the provision of the resistor 27, and the transistor 15 is accordingly turned ON. In addition, the collector voltage of the transistor 15 becomes large as shown by a3 in FIG. 2(A).

When the transistor 15 is turned ON, the capacitor $C_1$ of the integrating circuit 16, is charged through the resistor $R_1$ of the integrating circuit 16 with a predetermined time constant. Hence, the voltage b3 at the connection point 17 gradually increases as shown in FIG. 2(B). In this state, a current flows through the resistor 21 due to the ON state of the transistor 20. As a result, the threshold value of the transistor 19 rises by an amount which corresponds to the voltage drop in the resistor 21, and the threshold value $T_2$ of the transistor 19 becomes as shown by a broken line, where $T_2$ is greater than $T_1$. Due to this rise in the threshold value of the transistor 19, the transistor 19 remains in the OFF state even when the voltage at the connection point 17 increases. Therefore, the plunger remains in the activated state, and the reproducing apparatus remains in the normal reproducing mode.

When the capacitor $C_1$ is charged with the charging time constant which is determined by the capacitor $C_1$ and the resistor $R_1$ of the integrating circuit, the transistor 19 is turned ON. The transistor 20 is turned OFF, and the collector voltage of the transistor 20 assumes a high level as shown by c4 in FIG. 2(C). Thus, a current is not applied to the plunger solenoid 23, and the plunger assumes the deactivated state. Because the transistor 20 is turned OFF and the collector voltage thereof assumes the high level, the base voltage of the transistor 15 increases, and the transistor 15 is turned OFF. As a result, the collector voltage of the transistor 15 decreases again as shown by a4 in FIG. 2(A), and the voltage b4 at the connection point 17 also decreases as shown in FIG. 2(B). As shown in FIG. 2(B), the threshold value of the transistor 19 again assumes the same level as the threshold value $T_1$ as shown by $T_3$.

Due to the decrease in the voltage b4 at the connection point 17, the transistor 19 is again turned OFF, and the transistor 20 is turned ON. Accordingly, a current is again applied to the plunger solenoid 23, and the plunger is activated for the second time. When the plunger is activated for the second time, the mode of the reproducing apparatus is switched to the stop mode. When the reproducing apparatus assumes the stop mode, the switch 24 opens to cut off the supply of the large current to the motor 25. Moreover, a current is supplied to the transistor 19 through the motor 25, to turn the transistor 19 ON and to turn the transistor 20 OFF. Thus, a current is no longer applied to the plunger solenoid 23, and the plunger assumes the deactivated state. Therefore, the mode of the reproducing apparatus is returned to its initial mode.

When the unrecorded band detecting circuit 13 detects the unrecorded band during the above program selecting mode, the transistor 19 is turned OFF and the transistor 20 is turned ON, to activate the plunger and switch the mode of the reproducing apparatus to the normal reproducing mode. After the mode of the reproducing apparatus is switched to the normal reproducing mode, the transistor 19 is not turned OFF because the pulse signal is produced from the rotation detecting circuit 14. Accordingly, the plunger is prevented from becoming activated again.

Therefore, according to the mode switching circuit of the present invention, especially when the end of the tape is reached before the unrecorded band is detected during the program selecting mode in which the magnetic tape moves in the fast-forward mode, the mode of the reproducing apparatus is automatically switched once to the normal reproducing mode and then switched to the stop mode, to put the plunger in the deactivated state.

Figure 3:
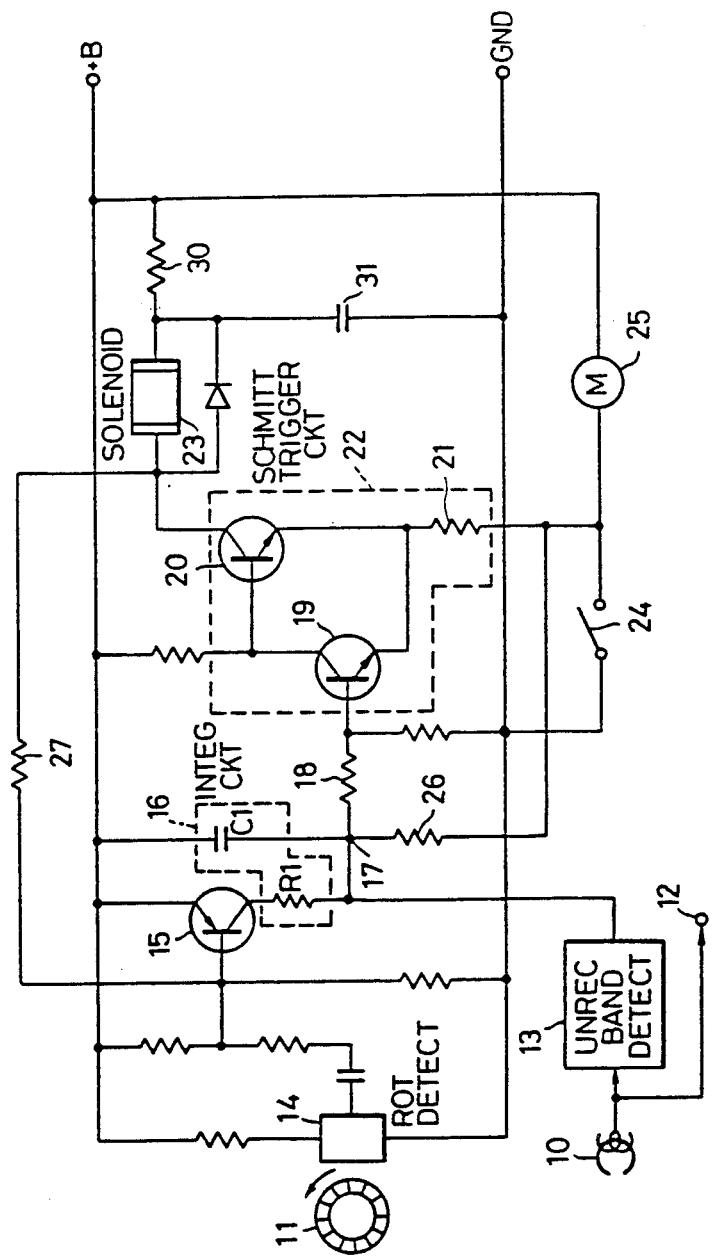
FIG. 3 is a systematic circuit diagram showing a second embodiment of a mode switching circuit according to the present invention.

A second embodiment of the mode switching circuit according to the present invention is shown in FIG. 3. In FIG. 3, those parts which are the same as those corresponding parts in FIG. 1 are designated by the same reference numerals, and their description will be omitted. In FIG. 3, a resistor 30 is coupled between the plunger solenoid 23 and the power source +B. In addition, a capacitor 31 is coupled between the plunger solenoid 23 and the ground (GND).

Figure 4:
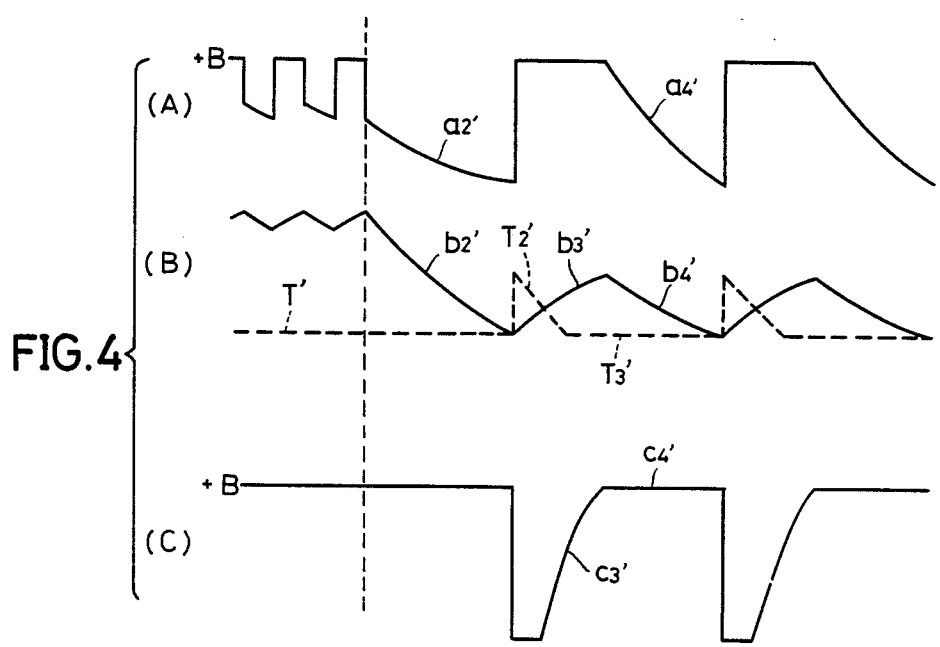
FIGS. 4(A) through 4(C) are graphs respectively showing signal waveforms at each part of the circuit system shown in FIG. 3.

When the end of the tape is reached before the unrecorded band is detected during the program selecting mode, the collector voltage a2' of the transistor 15 decreases as shown in FIG. 4(A), and the voltage b2' at the connection point 17 also decreases as shown in FIG. 4(B). Hence, the transistor 20 is turned ON. The time it takes for the transistor 20 to turn OFF due to the increase in the voltage b3' at the connection point 17, is lengthened according to a time constant which is determined by the resistor 30 and the capacitor 31.

That is, although the threshold value $T_1'$ of the transistor 19 rises to the threshold value $T_2'$ as shown in FIG. 4(B) due to the ON state of the transistor 20, this threshold value $T_2'$ gradually drops due to the discharge of the capictor 31. The transistor 20 is ON during a period in which the threshold value $T_2'$ is greater than the voltage b3' at the connection point 17, and the reproducing apparatus is in the normal reproducing mode during this period. Next, when the voltage b3' at the connection point 17 becomes greater than the threshold value $T_2'$, the transistor 20 is turned OFF due to the ON state of the transistor 19. Thus, the collector voltage c3' of the transistor 20 gradually increases with the time constant which is determined by the resistor 30 and the capacitor 31, as shown in FIG. 4(C). When the collector voltage of the transistor 20 becomes greater than a voltage (+B−0.7) volts, the transistor 15 is turned OFF. Accordingly, the collector voltage a4' of the transistor 15 and the voltage b4' at the connection point 17 both decrease. When the voltage b4' at the connection point 17 becomes equal to the threshold value $T_3'$, the transistor 20 is again turned ON, and the plunger is activated to switch the mode of the reproducing apparatus to the stop mode.

According to the present embodiment, the period of the switching from the normal reproducing mode to the stop mode, can be made longer than the switching period of the first embodiment described before. In the present embodiment, the above switching period can be appropriately adjusted, by setting the capacitance of the capacitor 31 to a suitable value. In addition, because there is the back-up energy provided by the charged voltage in the capacitor 31 as the plunger solenoid 23 operates, the operation of the plunger solenoid 23 is less affected by fluctuations in the power source voltage +B. Other operations of the circuit of the present embodiment, are the same as the operations of the circuit of the first embodiment described before, and description of these other operations will therefore be omitted.

Figure 5:
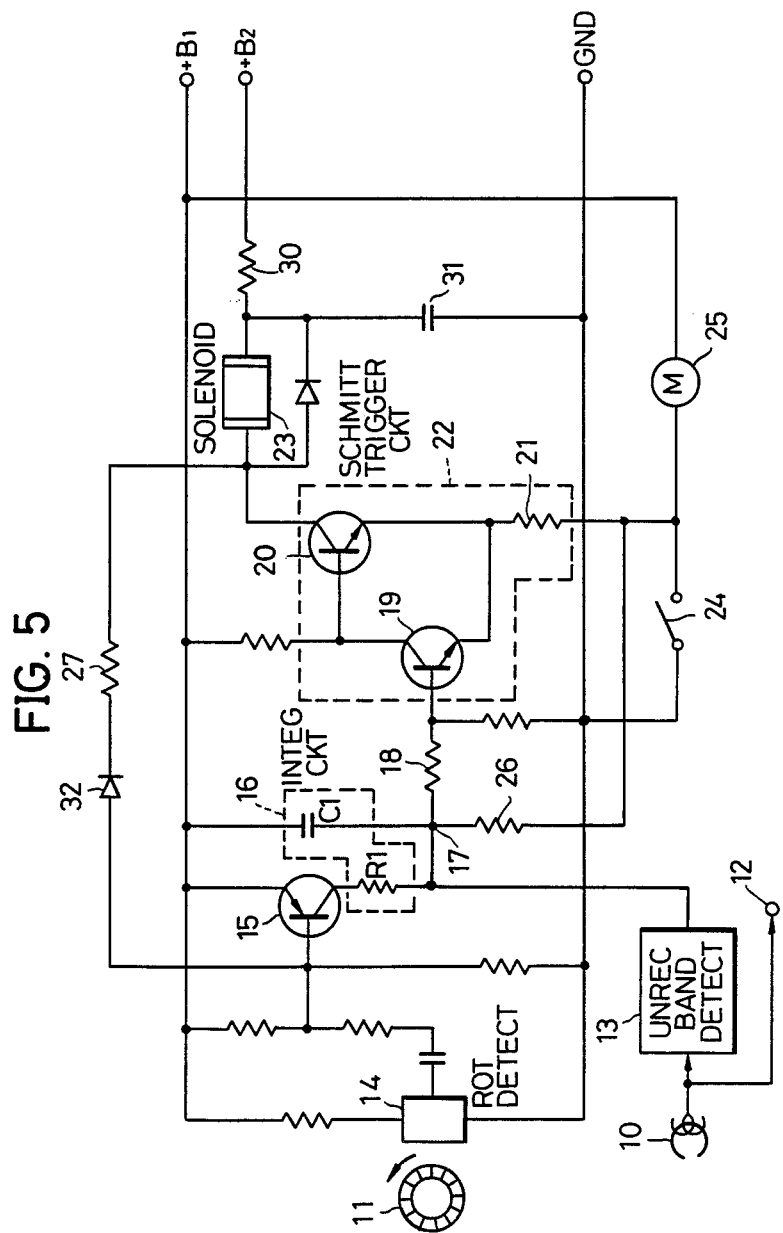
FIG. 5 is a systematic circuit diagram showing a third embodiment of a mode switching circuit according to the present invention.

A third embodiment of a mode switching circuit according to the present invention is shown in FIG. 5. In FIG. 5, those parts which are the same as those corresponding parts in FIGS. 1 and 3 are designated by the same reference numerals, and their description will be omitted. The voltage which is applied to the plunger solenoid 23, is obtained from a power source $+B_2$. On the other hand, a voltage which is applied to a circuit which controls the plunger solenoid 23 to its operating and non-operating states, is obtained from a power source $+B_1$, where the voltage $+B_1$ is smaller than the voltage $+B_2$. A diode 32 is coupled between the resistor 27 and the base of the transistor 15. The anode of the diode 32 is coupled to the base of the transistor 15, and the cathode of the diode 32 is coupled to the resistor 27.

Because the diode 32 is connected in the manner shown in FIG. 5, a large current will not flow to the transistor 15 even though two different voltages from the power sources $+B_1$ and $+B_2$ are used, where the voltage $+B_1$ is smaller than the voltage $+B_2$, and no problems will be introduced by this arrangement.

A fourth embodiment of a mode switching circuit according to the present invention is shown in FIG. 6. In FIG. 6, those parts which are the same as those corresponding parts in FIGS. 1, 3, and 5 will be designated by the same reference numerals, and their description will be omitted. In the present embodiment, a capacitor 32 is coupled between ground, and a connection point between the resistor 27 and the diode 32, in the circuit of the third embodiment shown in FIG. 5.

The capacitor 32 is charged during the OFF state of the transistor 20. The charge in the capacitor 32 is discharged through the resistor 27 and the transistor 20, during the ON state of the transistor 20. Hence, as in the case of the circuit of the second embodiment described before, the transistor 20 is gradually turned OFF, and the period of the switching from the normal reproducing mode to the stop mode may be lengthened. In the present embodiment, this switching period can also be appropriately adjusted by setting the capacitance of the capacitor 22 to a suitable value.

The third embodiment shown in FIG. 5 and the fourth embodiment shown in FIG. 6, respectively employ the resistor 30 and the capacitor 31 which are employed in the second embodiment shown in FIG. 3. However, the circuit arrangements of the third and fourth embodiments are not limited to those shown in FIGS. 5 and 6, and for example, the resistor 30 and the capacitor 31 may be omitted as in the first embodiment shown in FIG. 1.

Further, the present invention is not limited to these embodiments, but various variations and modifications may be made without departing from the scope of the present invention.

What is claimed is:

1. A mode switching circuit for use in a reproducing apparatus, said mode switching circuit comprising:
   rotation detecting means for detecting the rotation of a rotary body which rotates according to a moving tape;
   a plunger solenoid for driving a plunger which switches the operating state of the reproducing apparatus to a state which is in accordance with the moving mode of the tape;
   unrecorded band detecting means for detecting an unrecorded band from the tape which moves in a fast-forward mode during a program selecting mode of the reproducing apparatus;
   control means coupled to said rotation detecting means and to said unrecorded band detecting means, for cutting off a supply of a current to said plunger solenoid while said rotation detecting means is detecting the rotation of said rotary body, for supplying a current to said plunger solenoid when said rotation detecting means detects a stoppage of the rotation of said rotary body, and for supplying a current to said plunger solenoid when said unrecorded band detecting means detects an unrecorded band during the program selecting mode of the reproducing apparatus; and
   a feedback path coupled from a connection point between said control means and said plunger solenoid to said rotation detecting means through a resistor.

2. A mode switching circuit as claimed in claim 1 in which said control means cooperates with said rotation detecting means, and supplies the current to said plunger solenoid to drive the plunger and to switch the mode of the reproducing apparatus to a normal reproducing mode and subsequently once cuts off the supply of the current to said plunger solenoid before supplying the current to said plunger solenoid to drive the plunger and to switch the mode of the reproducing apparatus to a stop mode when said rotation detecting means detects the stoppage of said rotary body before said unrecorded band detecting means detects the unrecorded band.

3. A mode switching circuit as claimed in claim 1 in which said rotation detecting means comprises a rotation detecting circuit for producing a detection pulse signal in response to the rotation of said rotary body, a first transistor which is repeatedly turned ON and OFF in response to the detection pulse signal from said rotation detecting circuit, and an integrating circuit for integrating an output signal of said first transistor, said control means comprises a second transistor having its base coupled to said integrating circuit and to said unrecorded band detecting means, and a third transistor coupled to said second transistor and to said plunger solenoid, said third transistor is controlled of its ON and OFF states in response to ON and OFF states of said second transistor and controls the supply and cut-off of the current to said plunger solenoid according to the ON and OFF states thereof, and said feedback path is coupled between a base of said first transistor and a connection point between said second transisitor and said plunger solenoid.

4. A mode switching circuit as claimed in claim 1 which further comprises a time constant circuit coupled within a circuit which supplies the current to said plunger solenoid.

5. A mode switching circuit as claimed in claim 3 which further comprises a diode coupled in series with said resistor within said feedback path in a reverse direction between the connection point between said second transistor and said plunger solenoid and the base of said first transistor.

6. A mode switching circuit as claimed in claim 5 which further comprises a capicitor coupled between ground and a connection point between said resistor and said diode.

* * * * *